United States Patent
Viitamäki

(10) Patent No.: US 6,883,488 B2
(45) Date of Patent: Apr. 26, 2005

(54) ROTARY COMBUSTION ENGINE

(76) Inventor: Tapio Viitamäki, Lipastinkuja 12, Koskenkorva (FI)

(*) Notice: Subject to any disclaimer, the term of this patent is extended or adjusted under 35 U.S.C. 154(b) by 33 days.

(21) Appl. No.: 10/466,620
(22) PCT Filed: Jan. 29, 2002
(86) PCT No.: PCT/FI02/00066
§ 371 (c)(1), (2), (4) Date: Nov. 7, 2003
(87) PCT Pub. No.: WO02/061247
PCT Pub. Date: Aug. 8, 2002

(65) Prior Publication Data
US 2004/0094101 A1 May 20, 2004

(30) Foreign Application Priority Data
Jan. 30, 2001 (FI) .............................................. 20010176

(51) Int. Cl.[7] .......................... F02B 53/04; F02B 53/00
(52) U.S. Cl. ....................... 123/240; 123/242; 418/265
(58) Field of Search ................................ 123/240, 242, 123/18 R; 418/265, 61.1; F02B 53/00

(56) References Cited

U.S. PATENT DOCUMENTS

| | | | |
|---|---|---|---|
| 3,381,668 A | 5/1968 | Agren ......................... | 123/240 |
| 3,923,431 A | 12/1975 | Abbey ........................ | 418/61.1 |
| 3,951,112 A * | 4/1976 | Hunter ........................ | 123/242 |
| 4,005,951 A | 2/1977 | Swinkels .................... | 418/61.1 |
| 4,033,299 A | 7/1977 | Manzoni ..................... | 123/240 |
| 4,355,603 A | 10/1982 | Stuckenbrok et al. ....... | 123/182 |
| 5,087,183 A * | 2/1992 | Edwards ..................... | 418/265 |

FOREIGN PATENT DOCUMENTS

| | | | | |
|---|---|---|---|---|
| DE | 20 15 936 | * | 4/1970 | .................. 123/240 |
| DE | 27 35 725 A1 | | 2/1979 | ........... F02B/53/00 |
| DE | 31 08 087 A1 * | | 9/1982 | .................. 123/240 |
| GB | 342264 | * | 1/1931 | .................. 123/240 |

* cited by examiner

Primary Examiner—Thai-Ba Trieu
(74) Attorney, Agent, or Firm—Oliff & Berridge, PLC

(57) ABSTRACT

A rotary combustion engine includes a driving eccentric ring arranged between a non-rotary outer casing and a non-rotary inner casing for rotating a power shaft situated inside the inner casing. In order to drive the eccentric ring, a combustion chamber arrangement is provided between the inner and the outer non-rotary casings for burning a mixture of fuel and air supplied thereto, the power shaft being provided with an eccentric element. In order to minimize the number of rotating components, a second eccentric ring is mounted by a bearing around the power shaft inside the aforementioned non-rotary inner casing, this second ring being coaxial with and fixed to the driving eccentric ring, and the eccentric ring arrangement being a substantially non-rotary unit that only performs an eccentric motion, which makes the power shaft rotate.

10 Claims, 11 Drawing Sheets

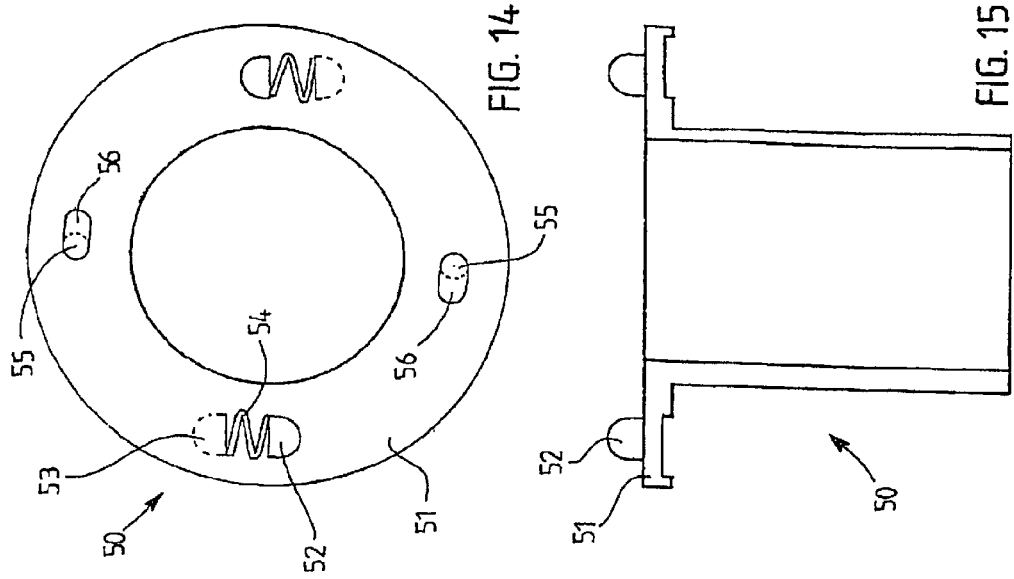
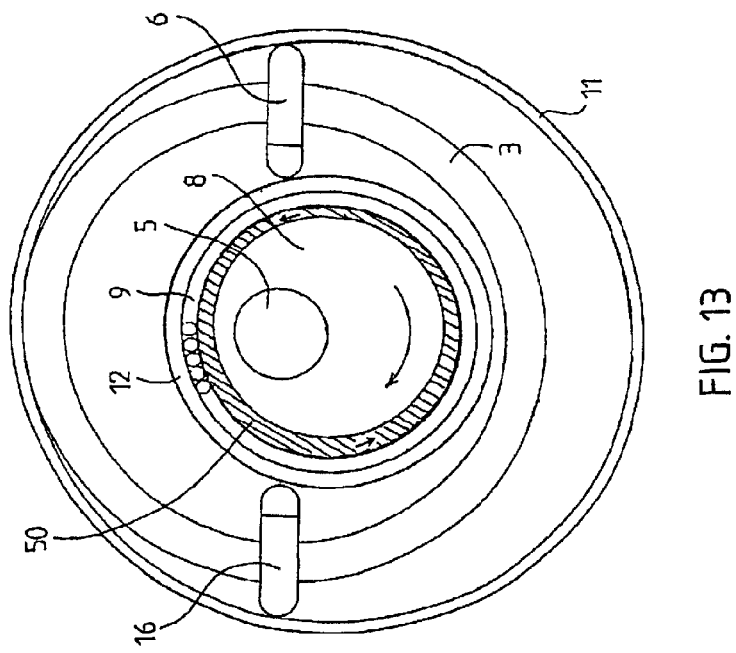

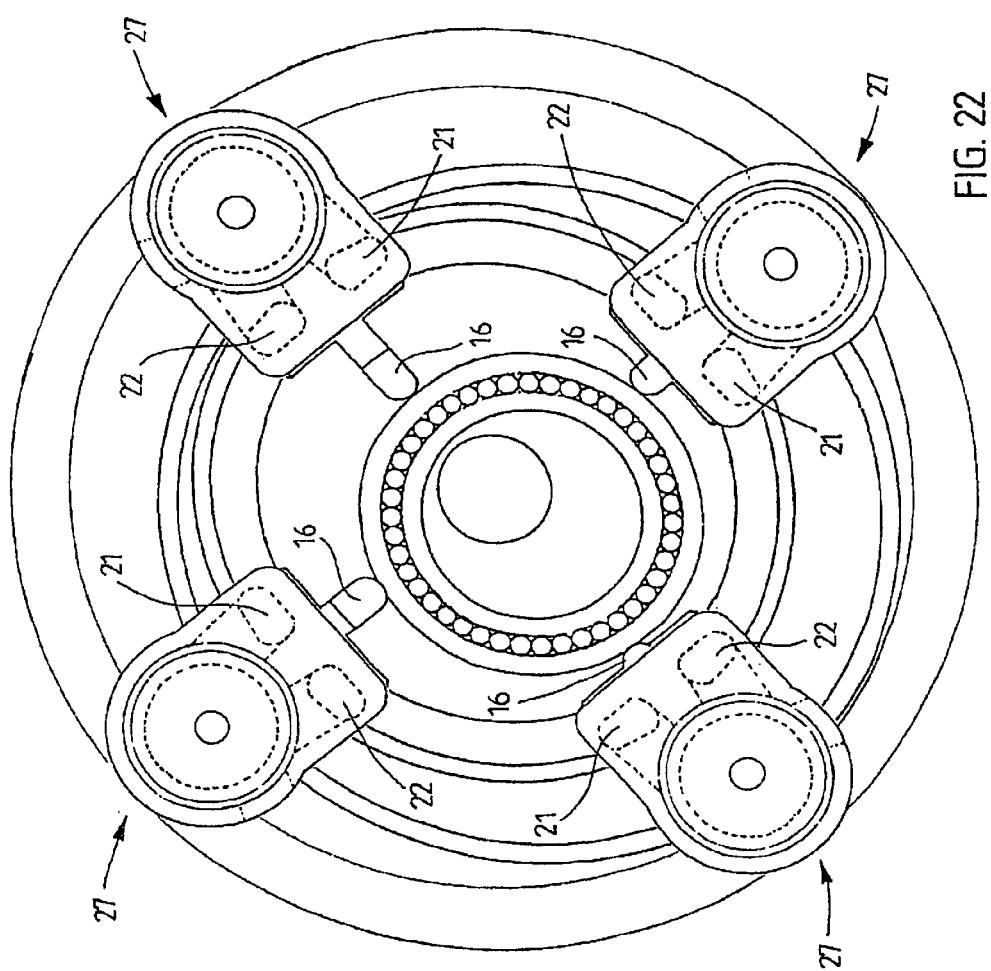

ROTARY COMBUSTION ENGINE

BACKGROUND OF THE INVENTION

1. Field of Invention

The invention relates to a rotary combustion engine comprising a non-rotary outer casing, a non-rotary inner casing, a power shaft arranged inside the inner casing and provided with an eccentric element, a first eccentric ring between the non-rotary outer casing and the non-rotary inner casing, a second eccentric ring mounted in bearings around the eccentric element of the power shaft and arranged to operate coaxially with the first eccentric ring, a combustion chamber arrangement for burning a mixture of fuel and air supplied into the engine.

2. Description of Related Art

A similar engine is known for example from U.S. Pat. No. 4,033,299, where a driving eccentric ring is fixed off the centre to a power shaft, so that they rotate together at the same speed of rotation. Mobile closing means are arranged to pass through the eccentric ring so as to rotate with the ring and they are sealed from their ends to the inner surface of an outer casing and to the outer surface of an inner casing. A combustion chamber is situation between the outer casing and the eccentric ring. A mixture of fuel and air is supplied laterally from the middle of the engine first into a chamber formed by the inner casing, from which it is sucked into the space between the inner casing and the eccentric ring and further to the combustion chamber between the eccentric ring and the outer casing. In the combustion chamber, the fuel mixture is compressed, ignited and finally removed. All the working phases of the engine take place during one cycle, and there is one explosion of the fuel mixture per one cycle. Suction and exhaust phases occur at different times. The operation corresponds substantially to a two-stroke engine.

A problem with the aforementioned rotary engine as well as all the other prior art rotary engines is the rotation of the driving elements (in this case for example the eccentric ring). These elements have naturally high peripheral speeds and there have been insurmountable problems with the friction and wearing of rotary and non-rotary components, preventing manufacture of a structure that would be able to compete with conventional engines. Another problem is the small combustion chamber, which causes high point temperatures. Also, the explosion is rather ineffective, since the thrust walls have been insufficient with respect to the engine size.

SUMMARY OF THE INVENTION

An objective of the invention is to develop a rotary combustion engine so as to solve the aforementioned problems. The objective of the invention is achieved by a combustion engine, which is characterized in that the first and the second eccentric ring are fixedly connected together, the combustion chamber arrangement for the suction, compression, combustion and exhaust phases of the fuel mixture is located between the first eccentric ring and the inner casing, the first eccentric ring driving the power shaft via the second eccentric ring, and that the eccentric ring arrangement is a substantially non-rotary unit that only performs an eccentric motion, which makes the power shaft rotate.

The invention is thus based on a driving eccentric ring, which does not rotate but only performs an eccentric movement. The only rotating element is the power shaft and the balancing means it possibly comprises (naturally excluding engine accessories).

A considerable advantage of the arrangement according to the invention is the elimination of all the problems that previously lead to wearing. The arrangement is also very simple in other respects and provides high power levels with a small engine as well.

These and other advantages will be evident to those skilled in the art from the description of the invention below.

BRIEF DESCRIPTION OF THE DRAWINGS

The invention will be described in more detail in connection with preferred embodiments and with reference to the accompanying drawings, in which

FIG. 13 shows the operation of a centring adjuster for the engine,

FIG. 14 shows the centring adjuster viewed from the other end,

FIG. 15 shows a sectional view of the centring adjuster,

FIG. 22 shows another alternative embodiment of the engine according to the invention.

DETAILED DESCRIPTION OF PREFERRED EMBODIMENTS

Figure 1:
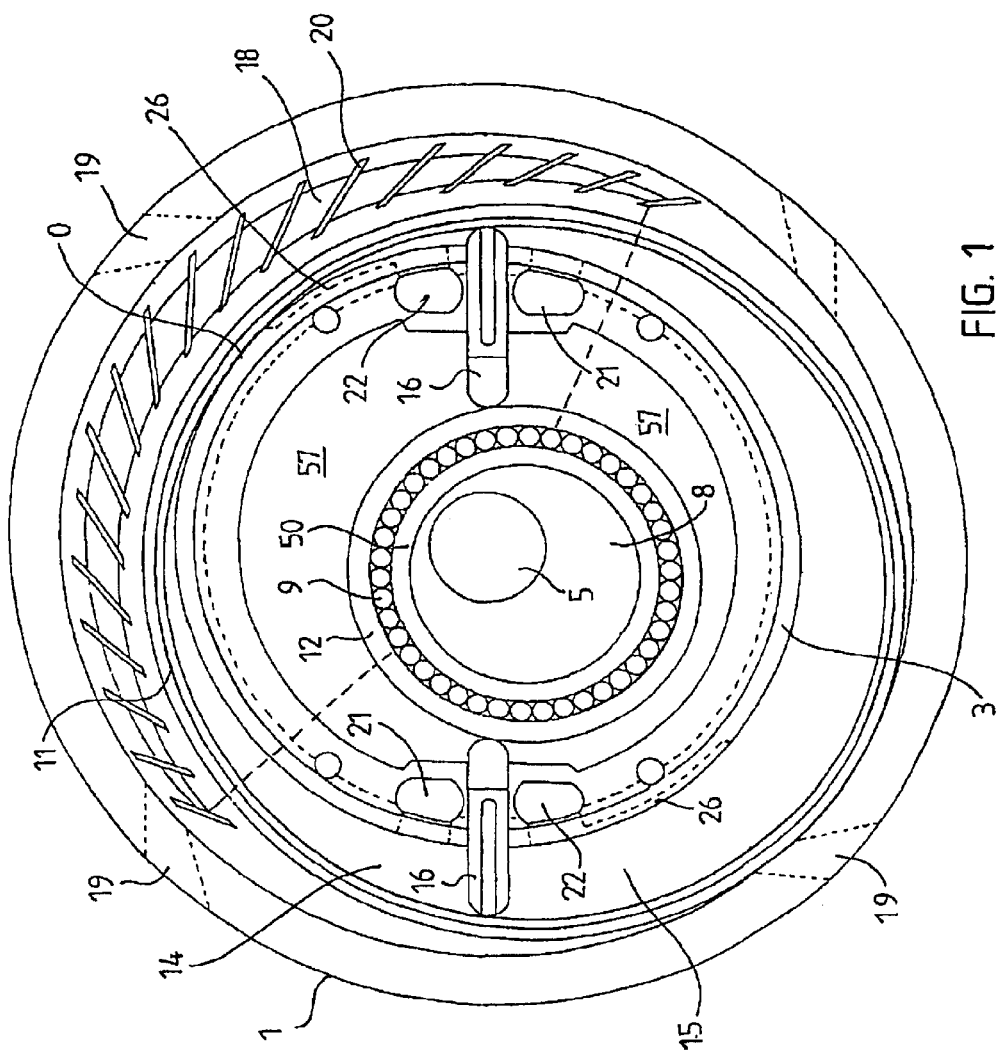
FIG. 1 shows a radial section of a rotary combustion engine according to the invention.
Figure 2:
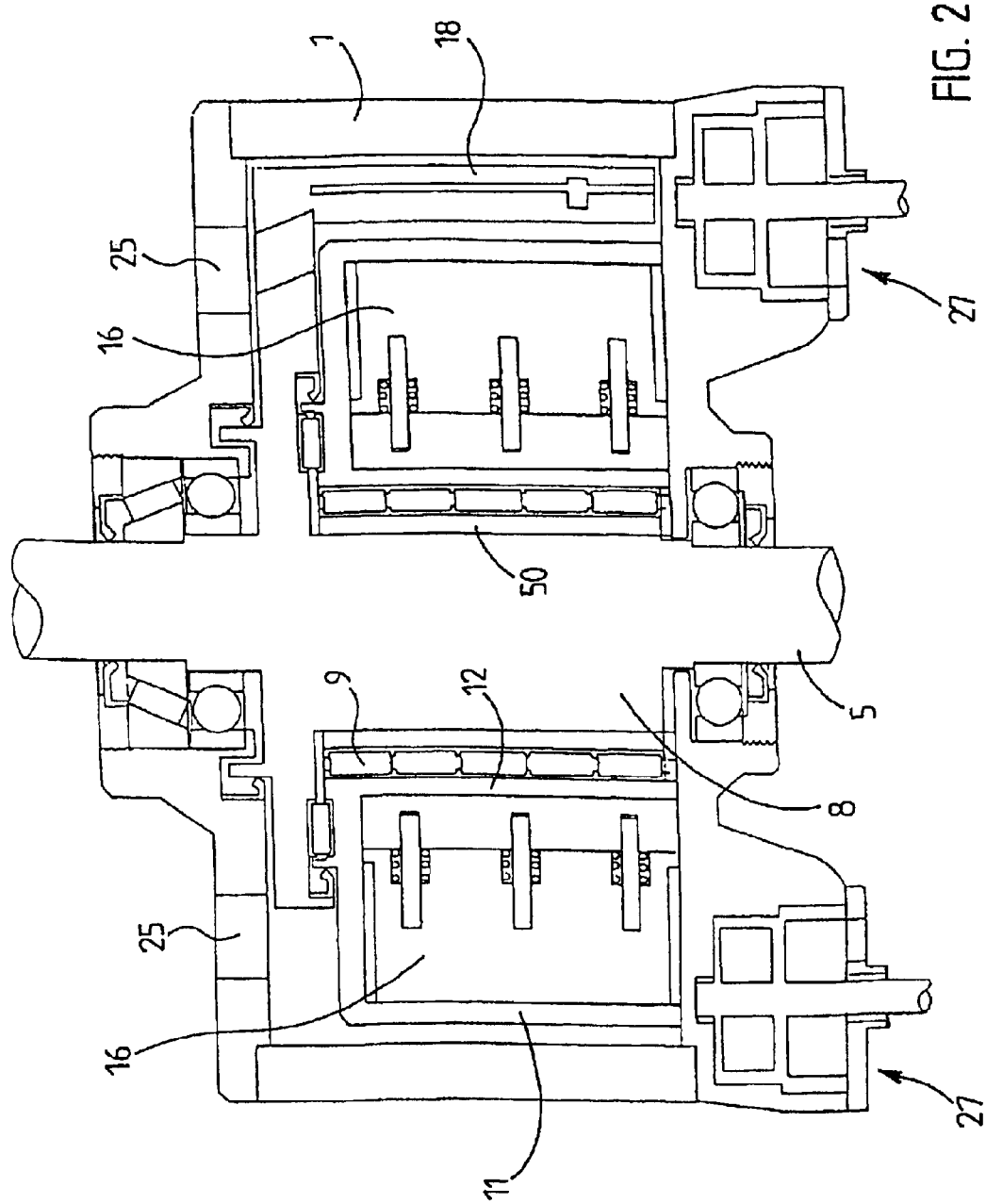
FIG. 2 shows an axial section of the combustion engine according to FIG. 1.
Figure 3:
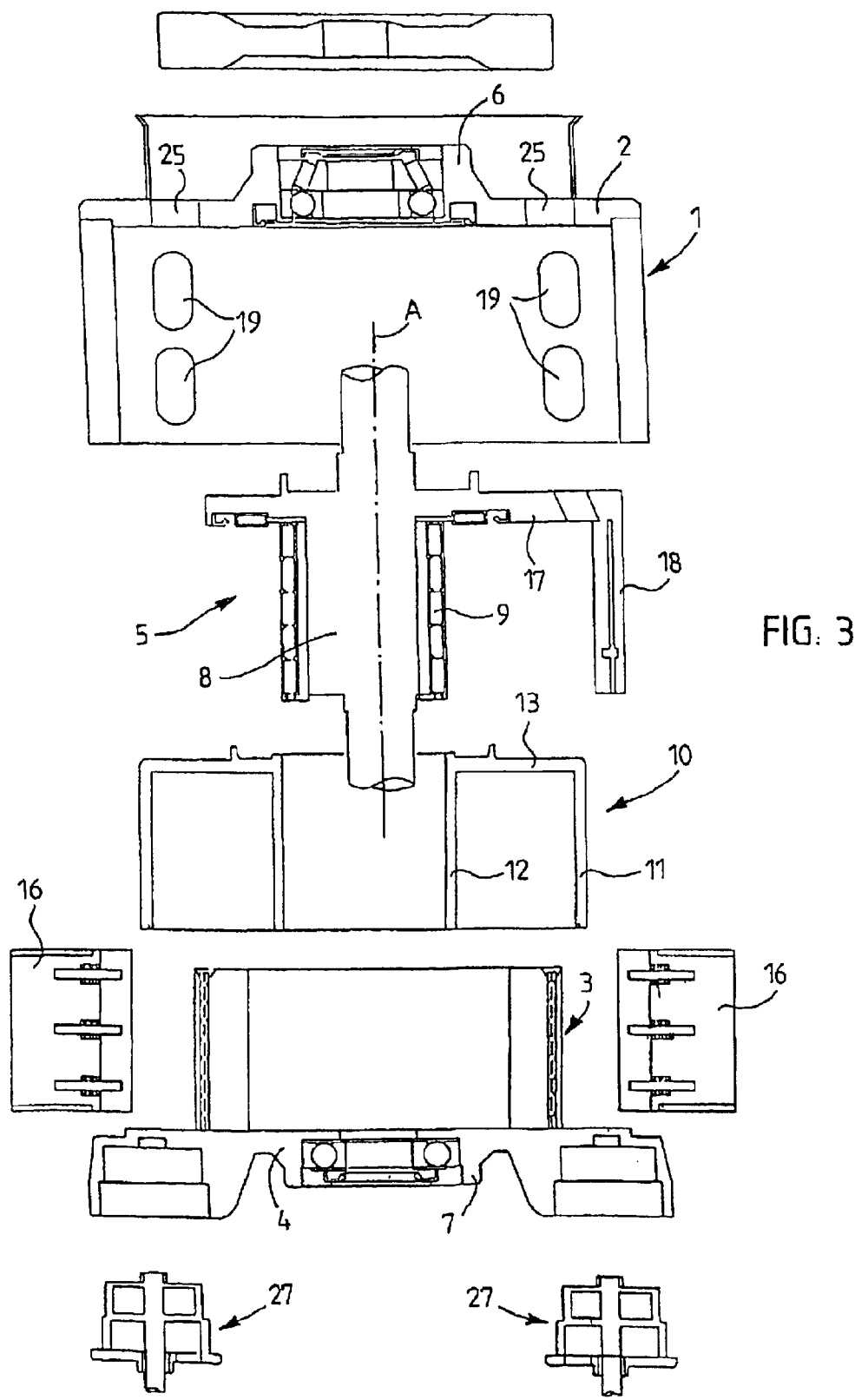
FIG. 3 shows an exploded view of the combustion engine according to the preceding figures, and with reference to FIGS. 1 to 3.

With reference to FIGS. 1 to 3, a rotary combustion engine shown therein comprises a non-rotary cylindrical outer casing 1, which is closed at one end by a first end plate 2, and a non-rotary inner casing 3, which is fastened to the other end of the non-rotary outer casing 1 via a second end plate 4 situated at one end of the non-rotary inner casing. Components 1 to 4 mainly constitute the outermost parts of the engine.

Components 1 to 4 enclose a power shaft 5 arranged inside the non-rotary the inner casing 3 and mounted in bearings 6, 7 to the end plates 2, 4 so that its central axis A is coaxial with the inner casing 3. The power shaft 5 comprises an eccentric element 8, which is essential for the operation of the engine and the surface of which is provided with a bearing 9. Components 1 to 4 further enclose an eccentric ring arrangement 10, which is also essential for the engine operation and comprises a driving cylindrical eccentric ring 11 arranged between the outer casing 1 and the non-rotary inner casing 3, and a second cylindrical eccentric ring 12 mounted on the eccentric element 8 of the power shaft 5 by means of the aforementioned bearing 9. The eccentric rings 11 and 12 are mutually coaxial and they are connected from one end by an end ring 13.

The eccentric ring arrangement 10 is a substantially non-rotary unit that only performs an eccentric motion, which makes the power shaft 5 rotate.

In order to drive the eccentric ring 11, a combustion chamber arrangement 14, 15 is provided between the ring and the inner casing for burning the fuel-air mixture supplied thereto. In this embodiment, the combustion chamber arrangement is divided into two sections 14, 15 of equal size by means of divider means 16 that pass through the inner casing 3. The divider means are arranged into close contact with the inner surface of the driving eccentric ring 11 and the outer surface of the second eccentric ring 12 and are arranged to move radially with respect to the inner casing 3, controlled by the eccentric rings 11, 12, when the eccentric ring arrangement 10 performs an eccentric motion.

The engine operates simply as follows. By means of a gas exchange arrangement described below, a combustible mixture is sucked into the spaces between the eccentric ring 11 and the inner casing 3, i.e. into chambers 14 and 15, and as the eccentric motion continues the mixture is subjected to maximum compression and is thereafter ignited, and the resulting pressure of explosion pushes the eccentric ring 11 towards the non-rotary outer casing 1, so that the eccentric motion of the ring propagates between the non-rotary inner and the outer casing 1, 3. During this eccentric motion, the points of contact of the eccentric ring 11 with the casings 1, 3 propagate along the casing surfaces in the direction of rotation of the power shaft 5. This means that the points of contact 'rotate' but the eccentric ring 11 itself does not rotate. This movement of the eccentric ring 11 in turn rotates the power shaft 5 (forces it to rotate) via a second eccentric element mounted on the eccentric element 8 of the shaft by means of a bearing 9, which ensures that the eccentric ring 11 will not start rotating. This operation will be described below in detail.

To balance the eccentric forces, a balancing arch 18 is arranged between the non-rotary outer casing 1 and the driving eccentric ring 11 at a distance from the surfaces thereof and fastened to the power shaft 5 via a collar 17. The arch is situated on the opposite side of the power shaft 5 with respect to the eccentric element 8. Due to this arrangement the balanceing arch 18 cannot come into contact with the eccentric ring 11 at any stage. By suitably designing the mass of the balancing arch 18, it is possible to eliminate the vibration generated by the eccentric motion.

The non-rotary outer casing 1 is also provided with openings 19, and the balancing arch is provided with blades 20 for sucking cooling air into the space between the non-rotary outer casing 1 and the driving eccentric ring 11. In addition to possible cooling by fluid, this considerably improves the cooling of the structures that have been heated by the combustion. The cooling air is removed via openings 25.

Figure 4:
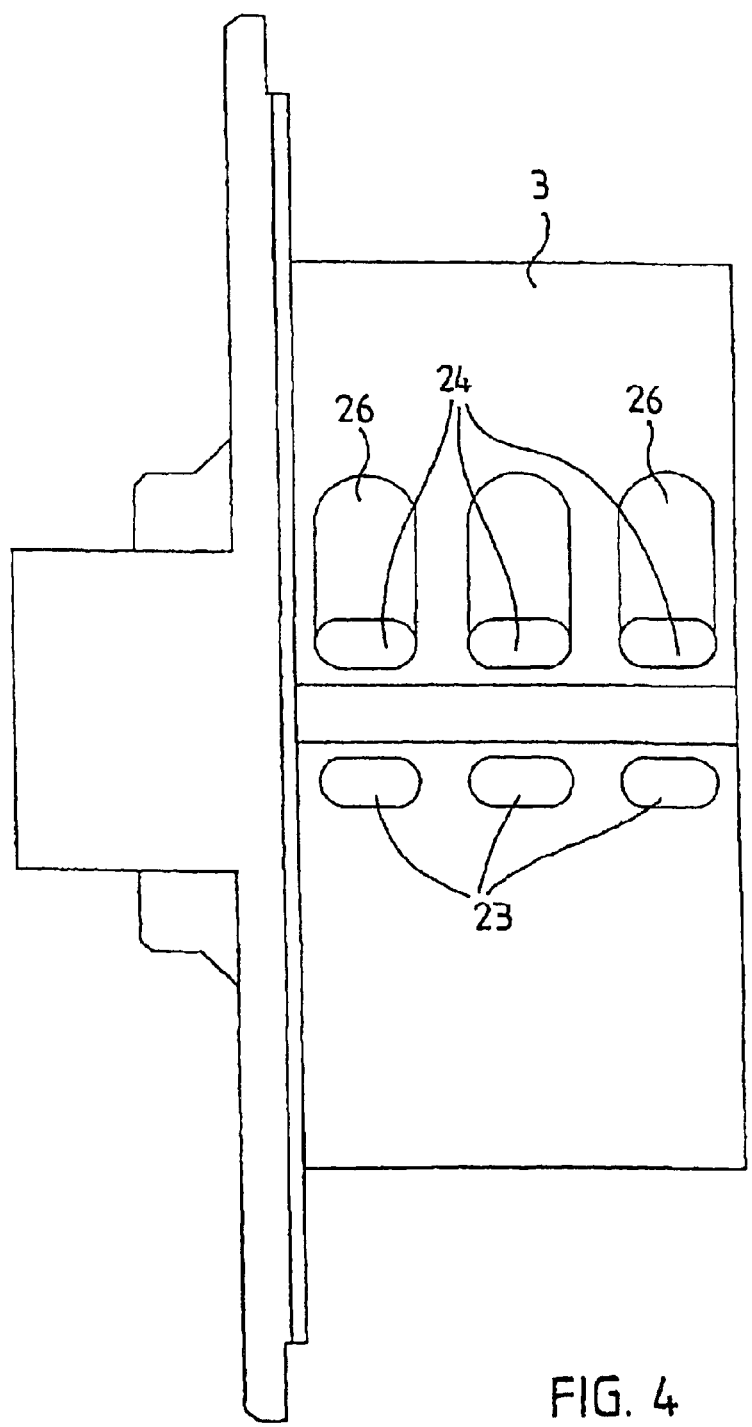
FIG. 4 shows an inner casing of the engine.

The gas exchange arrangement comprises suction ducts 21 and exhaust ducts 22 arranged in the inner casing 3. The suction ducts 21 end in the combustion chambers 14, 15 immediately after each divider means 16 viewed in the direction of motion of the eccentric ring 11 or in the direction of rotation of the power shaft 5, and the exhaust ducts 22 end in the chambers immediately before the divider means 16. Both the suction and exhaust ducts 21, 22 can end in the combustion chambers 14, 15 in the form of several, preferably parallel openings 23, 24, as shown in FIG. 4. When the exhaust duct 22 is closed by means of an arrangement described below, the duct 22 and the exhaust openings thereof 24 can also be used as a space into which the eccentric ring 11 presses the fuel mixture that was sucked into the chambers 14, 15 and wherein the mixture is subjected to maximum compression and then ignited. In order to direct the ignited fuel mixture immediately over a broader area, the inner casing 3 is provided for this purpose with guide recesses 26 formed at the front of the exhaust openings 24.

Figure 6:
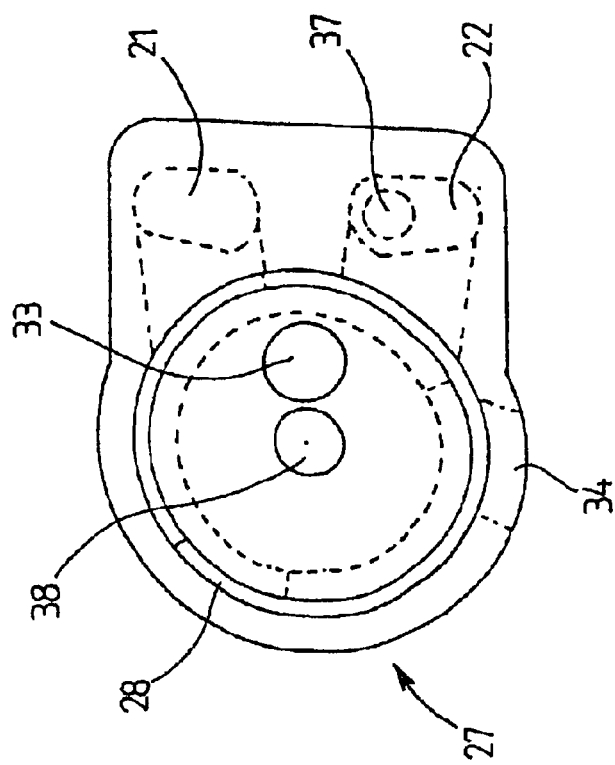
FIG. 6 shows an end view of the synchronizing device.
Figure 5:
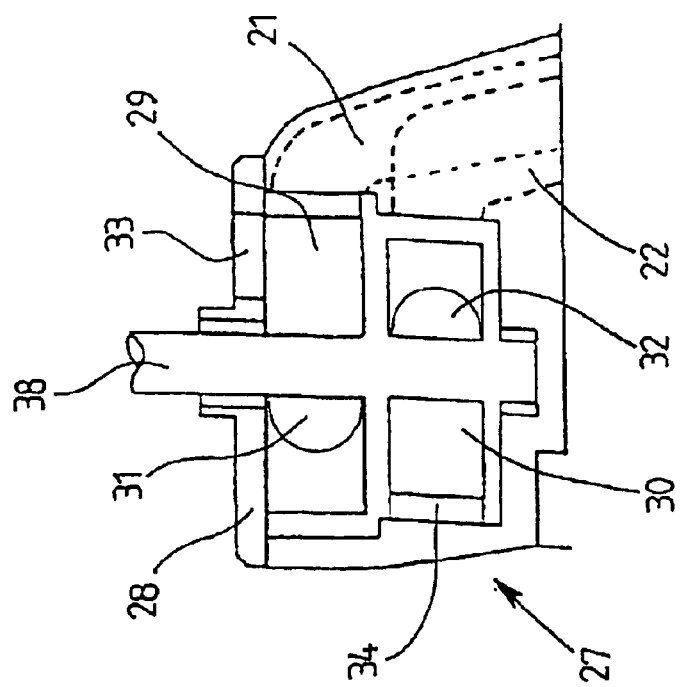
FIG. 5 shows a sectional view of a device for synchronizing the engine.
Figure 8:
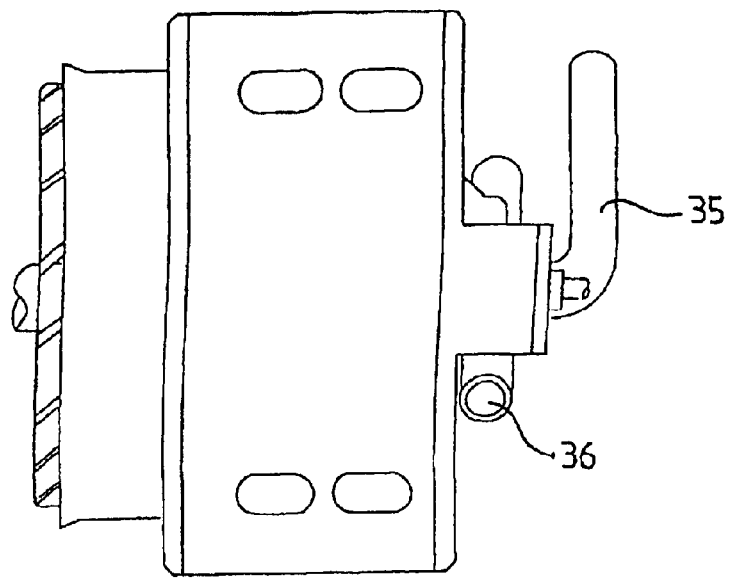
FIG. 8 shows a side view of the engine.
Figure 7:
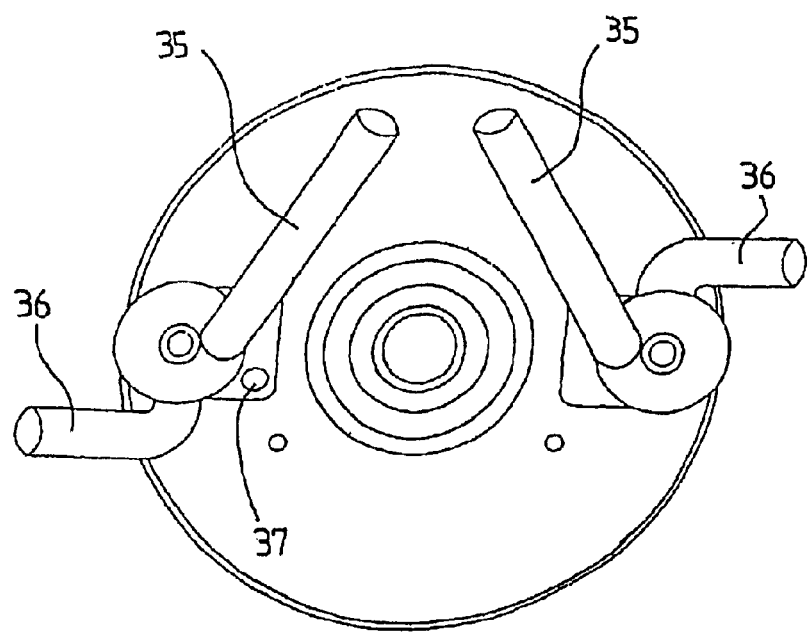
FIG. 7 shows an end view of the engine.

With reference particularly to FIGS. 2, 5 and 6, in order to open and close the suction and exhaust ducts 21, 22 in a synchronized manner, the end plate 4 of the non-rotary inner casing 3 is provided with a synchronizing device 27 for each combustion chamber 14, 15, and the ducts 21, 22 continue in the device and join a rotary synchronizing drum 28, which comprises extensions for the ducts 21, 22, i.e. annular chambers 29, 30 comprising elongated openings 31, 32. When the synchronizing drum 28 rotates, the openings 31, 32 alternately communicate with the ducts 21, 22 for the duration of time required for suction and exhaust phases or strokes. During the compression and explosion strokes, the synchronizing drum 28 naturally keeps both ducts 21, 22 closed. The synchronizing drum 28 rotates one cycle while the power shaft 5 rotates two cycles, i.e. the system corresponds to gas exchange in a normal four-stroke engine. The synchronizing device 28 can naturally be replaced with a normal valve structure that is known from conventional engine technology, but the selected method is not significant for the basic operation of the invention. The suction annular chamber 29 is provided with an inlet 33 at the end of the synchronizing device 27, and the exhaust annular chamber 30 is provided with an outlet 34 at the casing surface of the synchronizing device 27. These openings 33, 34 can be connected to suction and exhaust pipes 35, 36 as shown in FIGS. 7 and 8. A spark plug or the like required for igniting the fuel mixture is fastened in this example to a hole 37 formed on the side of the synchronizing device 27, such that it extends to the exhaust duct 22, which operates as an initial combustion chamber before the exhaust stroke, as described above. The synchronizing drum 28 of the synchronizing device 27 is connected to a synchronizing shaft 38, which is driven by the power shaft 5.

The divider means 16 preferably consists of two main components 39, 40, which are connected together by means of pins 41 that are able to move in the components 39, 40. The pins 41 are surrounded by springs 42 arranged between the components 39, 40 so as to move them apart so that they are pressed flexibly but tightly against the surfaces of the eccentric rings 11, 12. Furthermore, the ends of the divider means 16 that come into contact with these surfaces are rounded, especially due to the path of the eccentric ring 11. FIGS. 1 to 3 and 9 show the simplest embodiment of the divider means 16.

Figure 10:
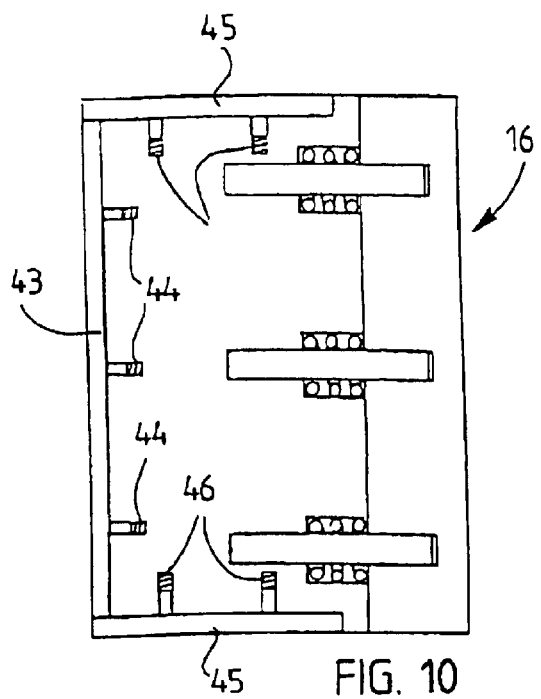
FIGS. 9 to 12 show a few embodiments of an engine divider.

FIG. 10 shows a further development of the divider means 16 described above, where a contact end 43 facing the eccentric ring 11 constitutes a separate unit, which is forced to move outwards by second springs 44. Also, the edges 45 touching the side walls of the combustion chambers 14, 15 are separate and forced to move sideways by means of springs 46.

Figure 11:
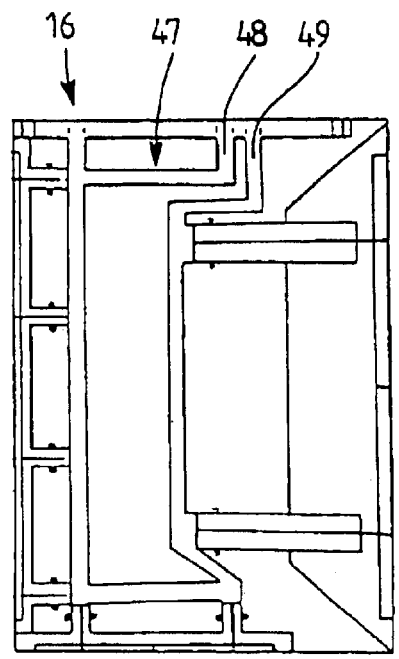
Figure 9:
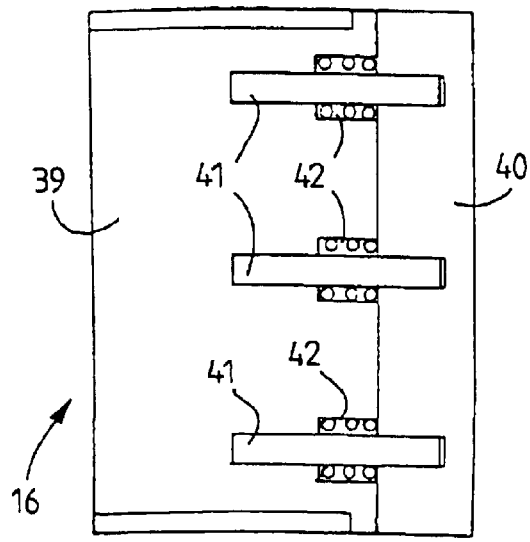

The divider means 16 can also be sealed hydraulically against the corresponding surfaces, as shown in FIG. 11. In such an arrangement, all the spring forces described above can be replaced with oil pressure in oil ducts 47 for example such that the oil is fed via duct 48 and removed via duct 49.

It is also possible to maintain the springs 42, 44, 46 described above, or some of them, in addition to the hydraulic function in order to ensure tight sealing also when the engine is being started and the oil pressure is not yet high enough.

Figure 12:
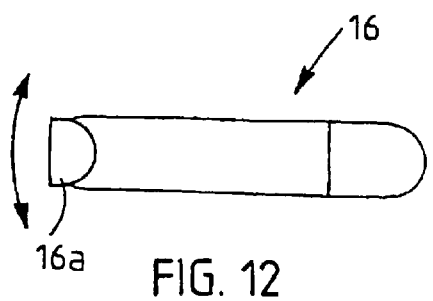

As shown in FIG. 12, the divider means 16 can be provided with a turning head 16a arranged against the surface of the eccentric element 11. The head 16a turns according to the path of the eccentric element 11 and is guided thereby. The greater surface of contact between the eccentric element 11 and the head 16a improves sealing and facilitates lubrication since the entire area of contact of the head 16a always touches the inner surface of the eccentric element 11. Wearing is minimal since there is practically no relative sliding movement between the surfaces.

Between the eccentric element 8 of the power shaft 5 and the bearing 9 there is preferably a centring adjuster 50 of the eccentric arrangement 11, 12 shown in FIGS. 13 to 15, which keeps the point of contact of the inner casing 3 and the eccentric ring 11 constant at the moment of ignition. This example of an adjustment system comprises a spring seat 52 provided in a side flange 51 of the centring adjuster 50, a spring seat 53 at the end of the non-rotary inner casing 3, and a spring 54 arranged between the spring seats for pushing the eccentric adjuster 50 forward along the eccentric element 8, thus making the eccentric ring 11 press against the inner casing 3. There are preferably two of such systems 52–54, as shown in FIGS. 13 to 15. The speed of rotation of the adjuster 50 is naturally equal to that of the power shaft 5, since they are interconnected. The end of the non-rotary inner casing 3 comprises locking pins 55, which interact with locking openings 56 provided in the side flange 51 of the adjuster 50 to prevent the eccentric ring 11 from opening with respect to the non-rotary inner casing 3, since the sealing is achieved after the adjustor 50 has moved in the opposite direction to the direction of rotation of the power shaft 5 during a working stroke. An explosion of the fuel mixture rotates, by means of the movement of the eccentric element 11, the power shaft 5 and the eccentric element 8 thereof, to which the locking pins 55 are connected. When the pin 55 is situated at the front of the locking opening 56 with respect to the direction of rotation of the power shaft 5, the aforementioned point of contact remains the same.

The degree of eccentricity of the centring adjustor 50 is so small that for example the springs 54 exert a considerable force on the eccentric ring 11. A small degree of eccentricity in the centring adjustor 50 is advantageous since the force generated by the explosion strains the adjustor only a little. The location of the ascending angle of the centring adjustor 50 on the power shaft 5 is important so that after the explosion the eccentric ring 11 would have an advantageous ascending angle. The technical implementation of the adjustment system can naturally vary between alternatives based on hydraulics, centrifugal forces or different combinations thereof, for example.

With reference to FIGS. 16 to 20, the rotary engine described above operates as follows.

Figure 16:
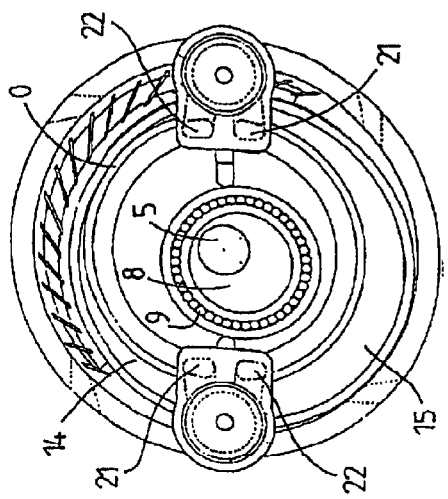
FIGS. 16 to 20 show different phases of operation of the engine.

In FIG. 16, the suction duct 21 of the upper chamber 14 is open, which means that a fuel mixture flows into the chamber 14 while the exhaust duct/combustion chamber 22 of the chamber is closing. The suction duct 21 of the lower chamber is closed and the exhaust duct/combustion chamber 22 is open in order to remove the fuel mixture that has already burned the in chamber 15.

Figure 17:
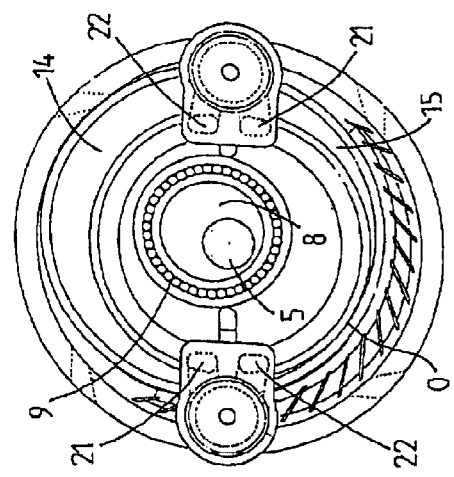

In FIG. 17, the suction and exhaust valves 21, 22 of the upper chamber 14 are closed, and the suction phase in the chamber 14 has changed into a compression phase. The suction duct 21 of the lower chamber 15 is open so that fuel mixture can flow into the chamber 15 while the exhaust duct/combustion chamber 22 of the chamber is closing, as shown in FIG. 16 for the upper chamber 14.

Figure 18:
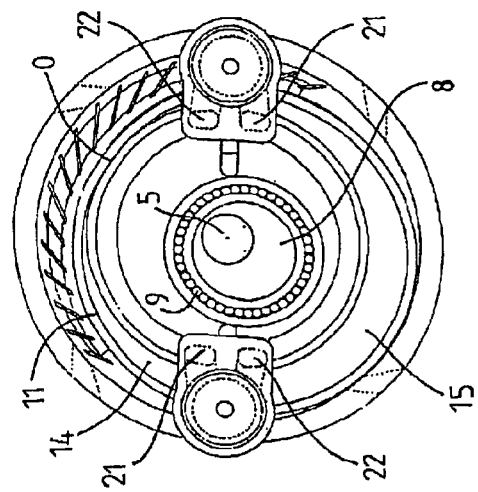

In FIG. 18, the suction and exhaust ducts of both chambers 14, 15 are closed, and the expansion stroke can begin in chamber 14. During the working stroke, the fuel mixture that has been subjected to maximum compression in the exhaust duct 22 and extensions thereof 26 is ignited, which results in an explosion that spreads into the entire upper chamber 14. The ignition takes place at a selected moment before the point of contact, or point zero, between the non-rotary inner casing 3 and the eccentric ring 11 arrives at the divider means 16 (ignition advance). After point zero has passed the divider means 16, the explosion/expansion phase pushes the eccentric ring 11 strongly towards the outer casing 1 while the inner eccentric ring 12 rotates the power shaft 5 via the eccentric element 8 thereof and the bearing so that the eccentric arrangement 11, 12 does not start rotating. The compression ratio of the mixture, i.e. the compression ratio of the expansion chamber 14, 22, 26 and the compression chamber 22, 26, can be adjusted to a desired value by suitably designing the extensions 26. The extensions 26 can also be used to direct the explosion of the fuel mixture. The suction and exhaust valves 21, 22 are closed in the chamber 14, and the suction phase thereof has changed into a compression phase.

Figure 19:
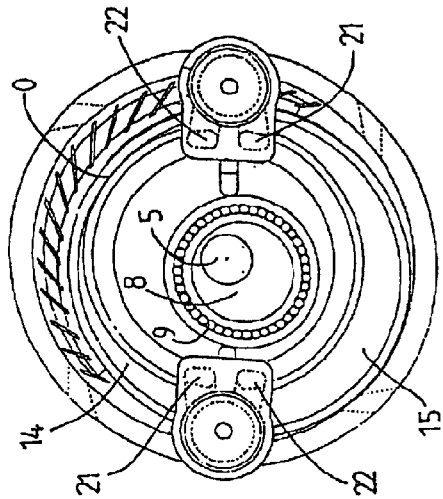

In FIG. 19, the suction duct 21 of the upper chamber 14 is still closed, but the exhaust duct/combustion chamber 22 has opened in order to exhaust the fuel mixture that burned in the chamber 14. The suction and exhaust ducts 21, 22 are still closed in the lower chamber 15, and a similar working stroke begins therein as described above in chamber 14.

Figure 20:
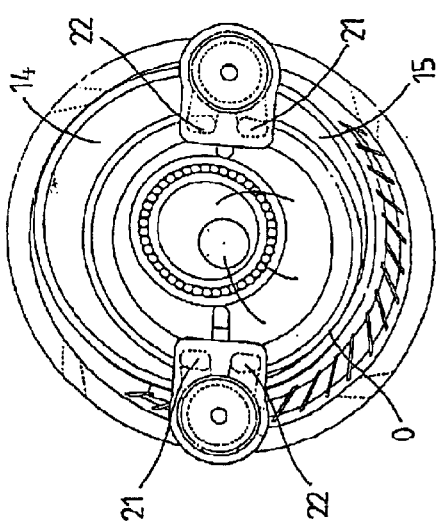

In FIG. 20, the same phases begin as in FIG. 16, and the operation of the engine consists of repeated cycles of these phases.

Figure 21:
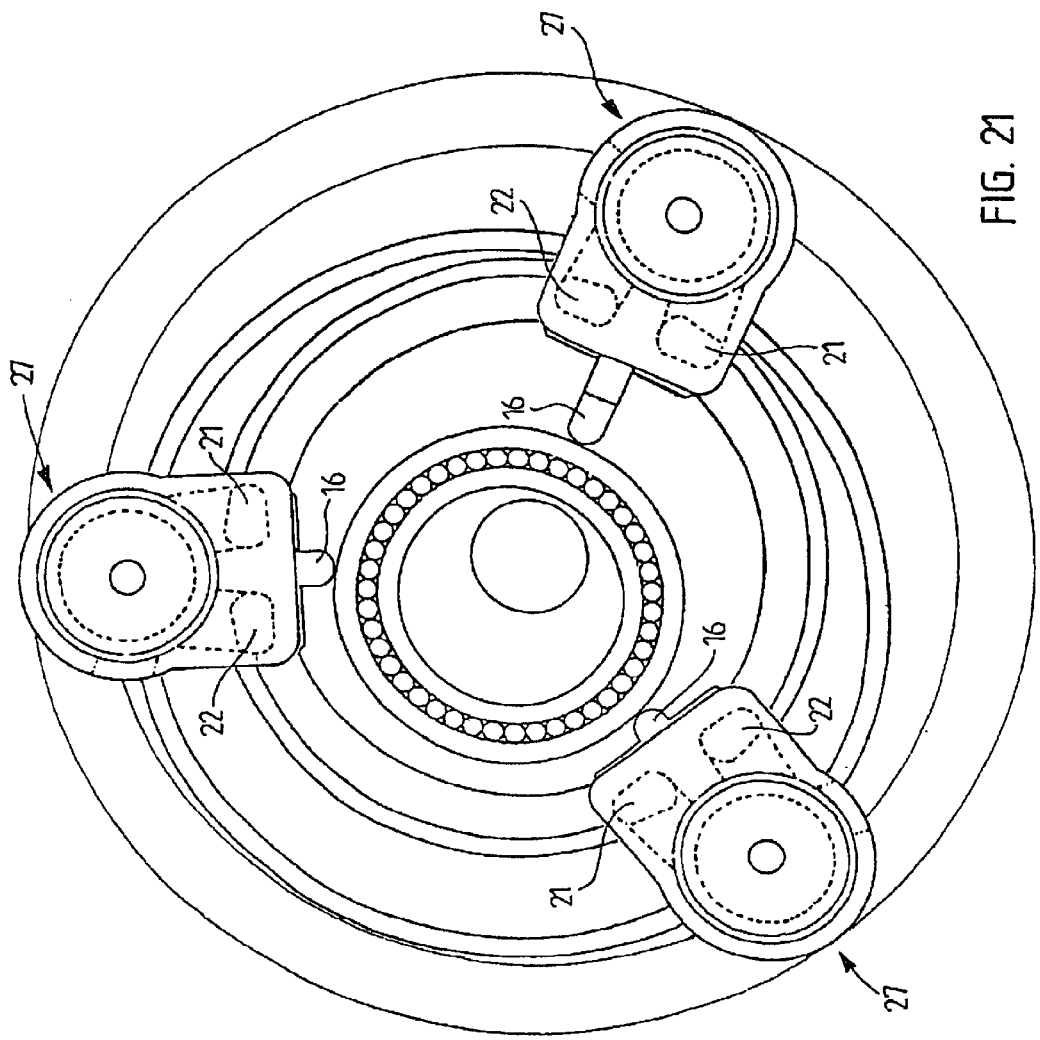
FIG. 21 shows an alternative embodiment of the engine according to the invention.

FIGS. 21 and 22 show a few alternative embodiments according to the invention. In the embodiment of FIG. 21, the entire chamber volume of the engine is divided into three parts by means of three circular closing means 16 and three synchronizing devices 27 and suction/exhaust ducts 21, 22. FIG. 22 shows four chambers, four circular closing means 16 and four synchronizing arrangements 16, 27, 21 and 22. The operation and structure of the engines is similar to what is shown in FIGS. 1 to 20, except that the engine working cycles have been quickened by adding working strokes and by providing the engine with necessary components described above in detail with corresponding accessories.

The gas exchange in the engine according to the invention corresponds substantially to gas exchange of a four-stroke engine. The engine can also be driven by diesel, since it is easy to provide high compression ratios.

It should also be noted that with suitable arrangements the spaces 57 between the inner eccentric ring 12 and the inner casing can be used for compressor purposes, including all pneumatic tools, by means of suitable air input and output systems. The delivery of this compressor is considerably higher than in all the prior art arrangements. Compression of gas or fluid is also possible.

The above specification of the invention is only intended to illustrate the basic idea of the invention. However, it is obvious to those skilled in the art that the basic idea can be implemented in several manners. The invention and the embodiments thereof are thus not restricted to the examples described above, but along with the details they can vary greatly within the scope of the appended claims. Thus, for example in engines with several chambers, such as 4, 5, 7 or 9 chambers, the contact of point zero with the inner casing is not necessary, since the chambers are short and the gas explosion always affects the entire chamber after point zero has crossed the middle of the combustion chamber. An advantageous number of chambers is 5, 7 or 8 due to synchronization, so that explosions would occur at even intervals (cf. the ignition order in a radial engine). In two-stroke operation, the spaces between the inner eccentric ring and the non-rotary inner casing can be used as crankcase chambers, since they are located outside the actual combustion chamber. During the suction phase, the gas mixture can be pushed from the crankcase chambers through the inner casing into working pressure chambers, which are also subject to an exhaust phase at the same time. This produces gas exchange corresponding to gas exchange in the presently used two-stroke engines. The difference is that in the arrangement according to the invention there is no need to add oil into the fuel mixture, since the mixture is not used to lubricate bearings. In two-stroke operation, suction air also preferably cools the inner casing.

What is claimed is:

1. A rotary combustion engine, comprising:
   a non-rotary outer casing,
   a non-rotary inner casing,
   a power shaft arranged inside the non-rotary inner casing and provided with an eccentric element,
   a first eccentric ring between the non-rotary outer casing and the non-rotary inner casing,
   a second eccentric ring mounted in bearings around the eccentric element of the power shaft and arranged to operate coaxially with the first eccentric ring,
   a combustion chamber arrangement for burning a mixture of fuel and air supplied into the engine,
   characterized in that
   the first and the second eccentric rings are fixedly connected together by an end ring,
   the combustion chamber arrangement for the suction, compression, combustion and exhaust phases of the fuel mixture is located between the first eccentric ring and the non-rotary inner casing, the first eccentric ring driving the power shaft via the second eccentric ring, and that
   the eccentric ring arrangement is a substantially non-rotary unit that only performs an eccentric motion, which makes the power shaft rotate.

2. An engine according to claim 1, characterized in that the combustion chamber arrangement is divided into at least two equal parts by a divider, which passes through the non-rotary inner casing and is arranged into close contact with the inner surface of the driving eccentric ring and the outer surface of the second eccentric ring, and the divider is arranged to move radially, guided by the eccentric rings, with respect to the non-rotary inner casing.

3. An engine according to claim 2, characterized in that a balancing arch is connected to the power shaft between the non-rotary outer casing and the driving eccentric ring in order to balance the eccentric forces, the balancing arch being located on the opposite side of the power shaft with respect to the eccentric element.

4. An engine according to claim 2, characterized in that the spaces between the inner eccentric ring and the non-rotary inner casing are formed as compressor chambers in order to produce compressed air.

5. An engine according to claim 1, characterized in that a balancing arch is connected to the power shaft between the non-rotary outer casing and the driving eccentric ring in order to balance the eccentric forces, the arch being located on the opposite side of the power shaft with respect to the eccentric element.

6. An engine according to claim 5, characterized in that the outer casing is provided with openings and the balancing arch is provided with blades for sucking cooling air into the space between the non-rotary outer casing and the driving eccentric ring.

7. An engine according to claim 6, characterized in that the spaces between the inner eccentric ring and the non-rotary inner casing are formed as compressor chambers in order to produce compressed air.

8. An engine according to claim 5, characterized in that the spaces between the inner eccentric ring and the non-rotary inner casing are formed as compressor chambers in order to produce compressed air.

9. An engine according to claim 1, characterized in that the spaces between the inner eccentric ring and the non-rotary inner casing are formed as compressor chambers in order to produce compressed air.

10. An engine according to claim 9, characterized in that the spaces between the inner eccentric ring and the non-rotary inner casing are formed as compressor chambers in order to produce compressed air.

* * * * *